(12) United States Patent
DeVitis et al.

(10) Patent No.: US 6,234,414 B1
(45) Date of Patent: May 22, 2001

(54) APPARATUS AND METHOD FOR SEALING SHAFTS

(75) Inventors: Paul R. DeVitis; James A. Johnson, both of Broomall, PA (US)

(73) Assignee: Pennsylvania Crusher Corporation, Broomall, PA (US)

( * ) Notice: Subject to any disclaimer, the term of this patent is extended or adjusted under 35 U.S.C. 154(b) by 0 days.

(21) Appl. No.: 09/324,886

(22) Filed: Jun. 3, 1999

(51) Int. Cl.[7] .................................................. B02C 19/00
(52) U.S. Cl. ........................................... 241/30; 241/101.2
(58) Field of Search .................................... 241/101.2, 30, 241/189.1; 277/306, 308, 352, 408, 516, 517, 527, 927

(56) References Cited

U.S. PATENT DOCUMENTS

| | | |
|---|---|---|
| 1,056,282 | 3/1913 | Koerting et al. . |
| 1,109,826 | 9/1914 | Doble . |
| 1,336,308 | 4/1920 | Lumley . |
| 2,245,866 | 6/1941 | McLachlan . |
| 2,350,448 | 6/1944 | Collins . |
| 2,509,162 | 5/1950 | Moses . |
| 2,834,617 | 5/1958 | Creasy . |
| 4,270,760 | 6/1981 | Greiman . |
| 4,270,762 | 6/1981 | Johnston . |

Primary Examiner—Mark Rosenbaum
(74) Attorney, Agent, or Firm—Hall, Priddy, Myers & Vande Sande

(57) ABSTRACT

Grinders, motors, engines and pumps require sealing, lubrication, and other forms of protection for shafts, bearings and packing. Fluid distribution rings and purge systems are useful aids. This disclosure illustrates a distribution ring in an enclosure surrounding a shaft. A ring surface and a confronting, radially spaced shaft surface define a clearance between them. A fluid supply passage extends from outside the enclosure to this clearance. A first centering member of the ring includes a first centering surface inclined to either side of a reference plane perpendicular to the shaft axis. Connected with a wall of the enclosure is a second centering member with a second centering surface inclined to the reference plane. Contact between the first and second centering surfaces holds the ring in predetermined radial position relative to the shaft, improves fluid distribution throughout the clearance circumference and can help exclude foreign matter from bearings and seals.

10 Claims, 6 Drawing Sheets

FIG. 1

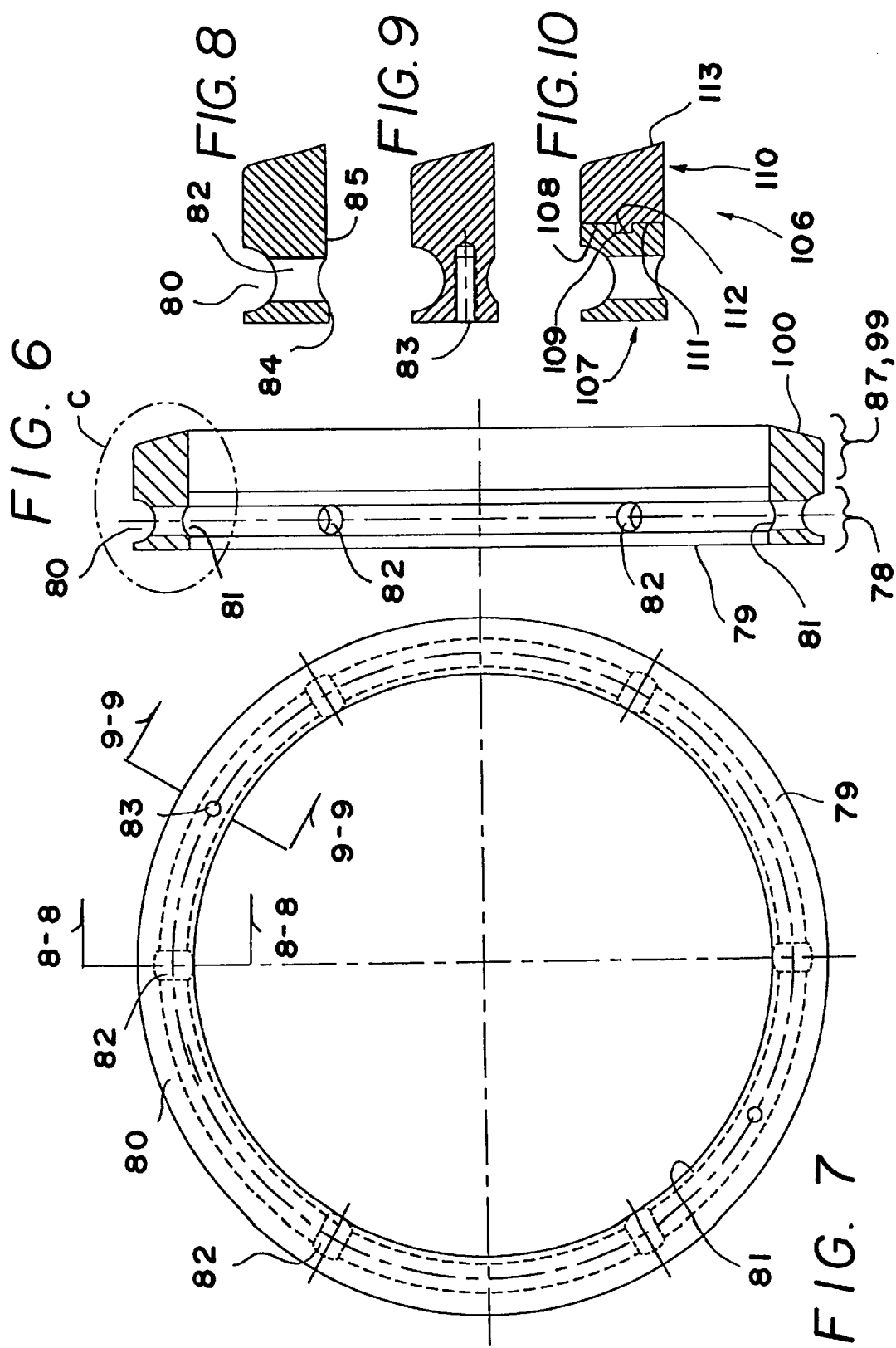

APPARATUS AND METHOD FOR SEALING SHAFTS

TECHNICAL FIELD

This invention relates to apparatus such as grinders, motors, engines, pumps and other apparatus and methods for operating such apparatus including a moving shaft-mounted member, and in which packing, a ring member such as a fluid distribution ring and a fluid purge system are provided, such as to prevent leakage and/or lubricate the packing and/or otherwise protect the packing, one or more bearings, the shaft or other components of the apparatus. In a specific preferred embodiment, the invention relates to rotary grinders in which abrasive material is processed at least in part by contact with a shaft-mounted rotor and in which packing and/or bearings in which the shaft and rotor rotate are protected from entry of abrasive fine particles with an improved ring-packing and-cavity arrangement and liquid purge system.

BACKGROUND OF THE INVENTION

Apparatus in which abrasive, corrosive or other damaging material is processed by contact with moving shaft-mounted members is prone to damage by such materials. These penetrate and damage portions of the shafts and/or adjacent packing provided to prevent the materials from reaching the bearings in which the shafts move.

It is known to employ fluid distribution rings with air, steam, water and grease purges to assist in barring entry of such materials into the packing, adjacent portions of the shafts and the bearings. There is however a need for improvements in the centering and sealing capabilities of these devices. The present invention is intended to fill either or both of these needs. But the invention has even broader applications, as will be shown below.

SUMMARY OF THE INVENTION

The invention has a number of aspects involving differing, new and non-obvious combinations of elements.

First Aspect

In one aspect, the invention relates generally to apparatus having a fluid purge system operating in conjunction with a shaft, packing and/or other portions of the apparatus. This aspect comprises the following elements.

First, there is a material processing chamber. It includes a zone in which material is present which should be substantially barred, during operation of the apparatus, from escaping through the packing, and, preferably, in some cases should be substantially barred from entering the interface between the packing and the shaft.

Second, there is a moveable shaft having a longitudinal axis and one or more surfaces. A material-contacting member is connected with the shaft and is present at least partly within the chamber during at least a portion of the motion of the shaft and said member.

At least one bearing is provided, in which the shaft moves. There is a cavity surrounding a portion of the shaft, and it is in communication with the above-mentioned zone. Packing is located in the cavity between the zone and the bearing and is held in sealing engagement with at least one surface of the shaft.

A substantially rigid ring member is located in an enclosure surrounding the shaft. It has at least one ring member surface located between said zone and the packing. This surface is positioned in confronting but spaced relationship with at least one portion of the shaft surface to define at least one small clearance between the confronting surfaces of the ring member and shaft. At least one fluid supply passage extends from outside the ring enclosure to said clearance.

At least one first centering member is connected with said ring member and includes at least one first centering surface at least partly inclined to either side of a reference plane perpendicular to the axis of the shaft.

There is also at least one second centering member that is connected with a wall of the ring member enclosure. It includes at least one second centering surface that is at least partly inclined to either side of said reference plane and is complementary to said first centering surface.

The positions of the first and second centering surfaces each are established with respect to the shaft axis so that, when the first and second centering surfaces are brought into contact with one another, the ring member surface is in a predetermined radial position with respect to the portion of the shaft confronted thereby.

Second Aspect

The second aspect of the invention involves size-reduction apparatus in which solid feed particles are fed into a rotating, shaft-mounted rotor and in which abrasive fine particulate material is present. This aspect includes the following combination of features.

There is a size-reduction chamber. It includes a zone, representing at least a portion of the chamber, in which the fine abrasive particulate material is present during operation of the apparatus.

Next, there is a rotatable shaft. It has a longitudinal axis and one or more surfaces. A size-reduction rotor is connected with the shaft and is present at least partly within the chamber during rotation of the shaft and rotor.

At least one bearing is provided in which the shaft rotates. A cavity surrounds a portion of the shaft and is in communication with said zone.

Packing is located in the cavity between said zone and the bearing and is held in sealing engagement with at least one surface of the shaft.

A substantially rigid ring member is located in an enclosure surrounding the shaft. It has at least one ring member surface located between the zone and the packing. This surface is positioned in confronting but spaced relationship with at least one portion of the shaft surface to define at least one small clearance between the confronting surfaces of the ring member and shaft. At least one liquid supply passage extends from outside the ring enclosure to the clearance.

At least one first centering member is connected with the ring member. It includes at least one first centering surface.

At least one second centering member is connected with a wall of said cavity. It likewise includes at least one second centering surface.

The positions of the first and second centering surfaces are each established with respect to the shaft axis so that, when the first and second centering surfaces are brought into contact with one another, the ring member surface is in a predetermined radial a position with respect to the portion of the shaft confronted thereby.

Third Aspect

A particularly important aspect of the invention entails apparatus for conversion of particulate solid ash material at least in part to abrasive fine ash particles by contact with a rotating, shaft-mounted rotor. This apparatus comprises a size-reduction chamber. The chamber includes peripheral wall means, end wall means and an interior zone, representing at least a portion of the chamber, in which the abrasive, fine ash particles are present during operation of the apparatus.

There is a rotatable shaft in the apparatus. It has a longitudinal axis.

A size-reduction rotor is connected with the shaft and is present at least partly within the chamber during rotation of the shaft and rotor.

There is at least one bearing mount that supports the shaft. It includes at least one bearing in which the shaft rotates and a seal cavity surrounding a portion of the shaft in communication with the zone.

Packing is located in the cavity between the above-mentioned zone and the bearing and is held in sealing engagement with at least one surface of the shaft.

A substantially rigid ring member is located at least partly in the cavity. This ring member is positioned in axial engagement with that portion of the packing which is nearest the zone. It has at least one ring member surface that is located between the zone and the packing and is positioned in confronting but radially spaced relationship with at least one portion of the shaft surface. This defines at least one small, substantially annular clearance between the confronting surfaces of the ring member and shaft. At least one fluid supply passage extends into the cavity, through the ring and into the clearance.

At least one first centering member is connected with the ring member. It includes at least one first centering surface. There is also at least one second centering member connected with a wall of said cavity, including at least one second centering surface.

The positions of the first and second centering surfaces each are established with respect to the shaft axis so that, when the first and second centering surfaces are brought into contact with one another, the confronting ring member surface and the portion of the shaft confronted thereby are established and maintained in a concentric relationship.

Fourth Aspect

This is a method of processing material in apparatus having a fluid purge system operating in conjunction with a shaft, packing and/or other portions of the apparatus. It comprises introducing process material into a material processing chamber. The chamber includes a zone in which the process material is present, and/or in which a potentially damaging material is present, during operation of said apparatus.

The method also includes causing a moveable shaft having a longitudinal axis and one or more surfaces to move in said chamber. A material-contacting member connected with the shaft is caused to move on a path which is at least partly within the chamber during at least a portion of the motion of the shaft and said member. Moreover, the shaft is caused to move in at least one bearing.

A cavity is provided which surrounds a portion of the shaft in communication with said zone. Also provided is packing in the cavity between said zone and the bearing, and the packing is held in sealing engagement with at least one surface of the shaft. A substantially rigid ring member is provided in an enclosure that surrounds the shaft. The ring has at least one ring member surface that is located between said zone and the packing and is positioned in confronting but spaced relationship with at least one portion of the shaft surface. This defines at least one small clearance between the confronting surfaces of the ring member and shaft.

The method further involves providing at least one first centering member connected with said ring member, including at least one first centering surface. It is at least partly inclined to either side of a reference plane perpendicular to the axis of the shaft. There is also provided at least one second centering member connected with a wall of the ring member enclosure. It includes at least one second centering surface which is at least partly inclined to either side of said reference plane and is complementary to said first centering surface.

By maintaining the first and second centering surfaces in contact with one another, the ring member surface is maintained in a predetermined radial position with respect to the portion of the shaft confronted thereby. Through at least one fluid supply passage, extending from outside the ring enclosure, purge fluid is supplied to said clearance. With the aid of the first and second centering members, a balanced distribution of fluid is maintained throughout the at least one small clearance between the confronting surfaces of the ring member and shaft.

Still other aspects of the invention are disclosed in the drawings and in the description of various and preferred embodiments, found below.

BRIEF DESCRIPTION OF THE DRAWINGS

FIG. 1 is a longitudinal section of a preferred embodiment of the invention in the form of a grinder for clinker or bottom ash.

FIG. 6 is an enlarged view of the fluid distribution ring of FIG. 5.

FIG. 7 is a view of the left end of the ring of FIG. 6 in elevation.

FIG. 8 is a partial section of the ring of FIGS. 6 and 7, in the area indicated by reference circle C, taken along section line 8—8 of FIG. 7.

FIG. 9 is a partial section of the ring of FIGS. 6 and 7 taken along section line 9—9 of FIG. 7.

FIG. 10 is similar to FIG. 8 but shows a modified form of ring member that can be substituted for the ring member of FIG. 8 in the grinder of FIGS. 1–9.

DESCRIPTION OF VARIOUS AND PREFERRED EMBODIMENTS

Figure 2:
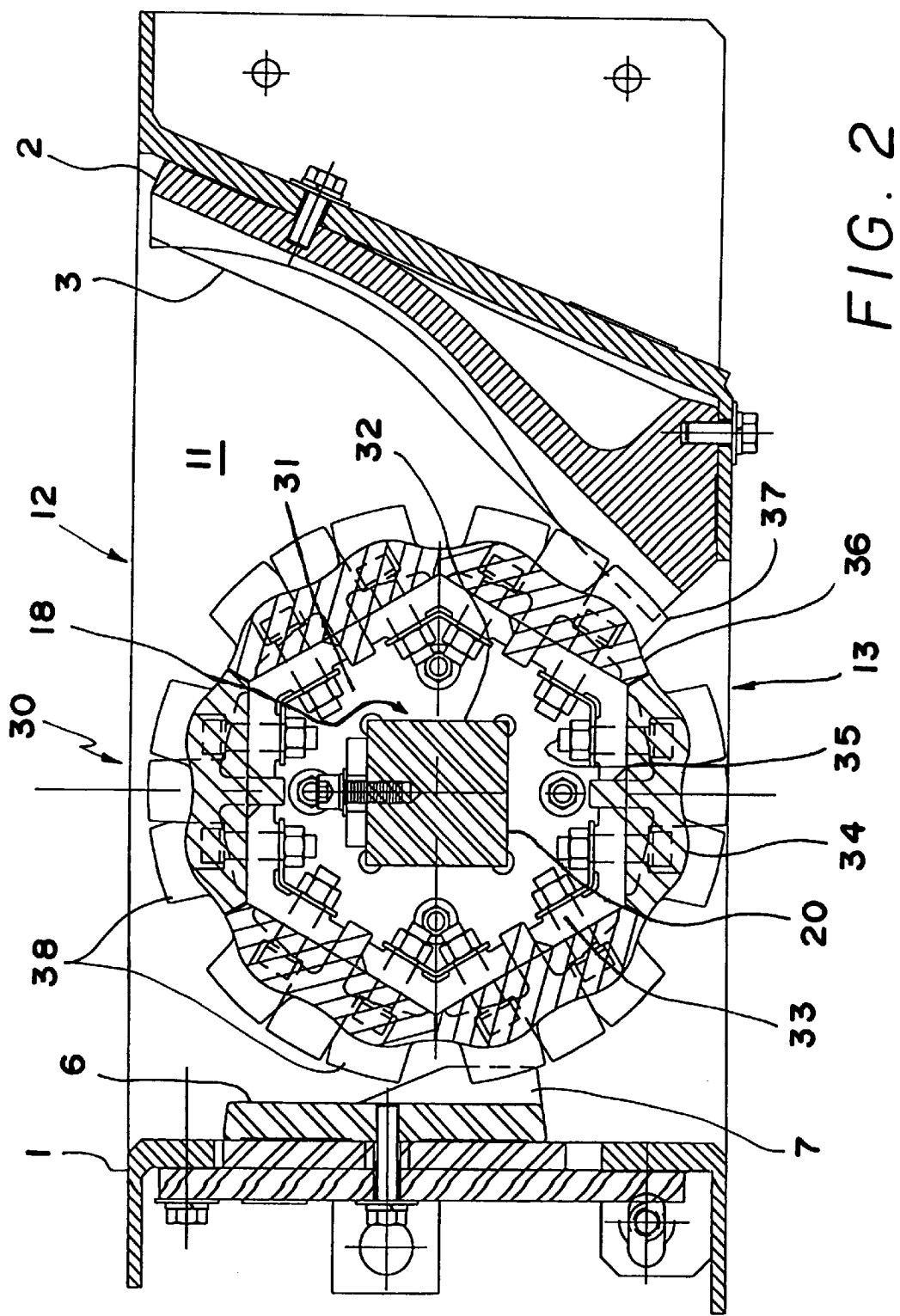
FIG. 2 is a transverse section of a grinder taken on section line 2—2 of FIG. 1.

The invention may be employed in any type of material processing with which the elements of the invention are or may be made compatible. Examples include combustion in certain types of internal combustion engines (see, e.g., U.S. Pat. No. 1,056,282), pumping liquids and emulsions (see, e.g., U.S. Pat. Nos. 2,834,617 and 2,509,162) pumping abrasive, corrosive, or poisonous slurries (see, e.g., U.S. Pat. Nos. 1,336,308, 2,245,866 and 2,350,448), mixing a variety of materials (see, e.g., U.S. Pat. Nos. 3,887,199, 4,021,050, 4,152,259 and 4,270,760), various forms of crushing and grinding (see, e.g., U.S. Pat. No. 4,270,762), bottom ash processing (see, e.g., U.S. Pat. No. 5,775,237) and a wide variety of other applications (see, e.g., U.S. Pat. No. 5,014,998). The invention may also be applied in processes where there is no damaging material present and where the goal is simply to provide accurate centering of a fluid distribution ring (see, e.g., U.S. Pat. No. 1,109,826). However, the preferred application of the invention, one in which the invention has overcome particularly vexing technical difficulties, is in size-reduction apparatus in which bulk particulate solid feed material is converted at least in part to abrasive fine particles by contact with a rotating, shaft-mounted rotor.

Virtually any process material may be employed in the apparatus and methods of the invention. The above-identified patents provide a number of examples.

Potentially damaging material and material which should be substantially barred from escaping through the packing or from entering into the packing-shaft interface may be or include the process material itself or may include any material involved in a process being conducted, such as a component part or derivative hereof (e.g. reaction product) or by-product and any other material which may be present in, be a result of or accompany operation of the process or the apparatus. Examples include ash, sand, water, latex slurries, fluorides, dust inducted from the air into an internal combustion engine and other materials.

The term "fine," as applied herein to abrasive particulate material refers to particles of any size that are sufficiently small to pass through the clearance between the shaft and the ring. In practice, the fine particles will have a particle size of about mesh or smaller, more particularly about 32 mesh or smaller and still more typically about 100 mesh or smaller.

As indicated above, the invention employs a movable shaft. The motion of the shaft may for example be a reciprocating motion. Preferably, however, the shaft rotates.

In general, the shaft is an elongated member. It should be rigid in the direction and to the extent required by the type of motion it undergoes. For rotary motion, at least portions of the shaft are usually cylindrical with a circular cross-section, although any other suitable cross-section can be employed. Likewise, where the motion is reciprocating the motion along the axis of the shaft, circular, square, rectangular, triangular and other cross-sections may be used when and if desired.

In a preferred embodiment, the shaft mounted member is the rotor of a size reduction apparatus. The invention appears to be useful in connection with a wide variety of size reduction devices commonly referred to by such terms as grinder, mill, hammermill, crusher, granulator and the like. These machines include rotors of varying design with movable or fixed radially extended material-contacting projections, which may include teeth, paddles, pivoted hammers, granulator rings and other forms of rotating size reduction elements.

While the shaft may be made of metal, any other suitable material may be employed. Where metallic shafts are employed, especially in high wear applications, portions of the shafts, especially in the vicinity of the packing, may be supplied with wear-resistant, e.g. hardened steel, other metallic or ceramic, facings.

The rotor or other material-contacting member is connected with the shaft. In this context, the term connected is intended to include virtually any form of association between the material-contacting member and the shaft which is suitable for the intended purpose. Thus, the shaft and material-contacting member may be integral or non-integral with one another. They may be separate parts fastened to one another, such as by welding, keys and keyways, bolts and/or any other suitable form(s) of fastening or securing.

The nature of the bearing employed will be influenced by the type of shaft motion involved. Preferably, roller bearings will be utilized for rotary motion and sleeve bearings will be employed for reciprocating motion. The sleeve bearing for reciprocal motion may have any desired cross-section, for example circular, square, triangular or other regular or irregular shape.

The cavity surrounding a portion of the shaft will be of an appropriate cross-section and length to confine the packing, holding it in proximity to the surrounded portion of the shaft. The cross-sectional shapes of the cavity and packing will preferably be complementary if not similar or identical, since a close fit between the cavity and the perimeter of the packing will be of assistance in maintaining sealing engagement between the packing and the shaft.

In a preferred embodiment, the cavity may include sufficient space in the longitudinal direction to enclose the ring member. However, the latter may, if desired, be housed in a separate enclosure surrounding the shaft. Moreover, the ring member may include a member that, at least in part, defines the cavity (see FIG. 3 of U.S. Pat. No. 2,834,617).

While the cavity may include space for the bearing and enclose it, the bearing may also be in its own separate enclosure. Such a separate bearing enclosure may be contiguous with or spaced apart from and in direct and either open or partial communication with the cavity. Preferably, whether the bearing enclosure is contiguous with the cavity or not, it may, and preferably does, have no substantial communication with the cavity. By this it is meant that the relationship between the enclosure and cavity is such as to prevent substantial flow of fluids or solids, in kinds and amounts unacceptable for the particular application in which the invention is being used, from the cavity to the bearing enclosure. In the presently most preferred embodiment, for convenient maintenance, access to the cavity is provided through a recess or other enclosure which is of larger cross-section than the cavity and in which the bearing is mounted. Communication between the cavity and recess are limited by the packing and a compression ring or other means for compressing the packing. Further protection may be provided for the bearing in the form of a slinger mounted on the shaft or bearing at the bearing end nearest the packing.

The cavity may be located so that it is partially or wholly within or without the chamber or may be located at least in part in a wall of, or straddling a wall of, the chamber. For example, if the apparatus has a chamber containing multiple rotors mounted at spaced intervals along the shaft, the cavity, along with an associated bearing and ring, could be located in a transverse bearing support post situated between two rotors and extending diametrically across the chamber. In this case, the cavity would be wholly within the chamber.

In a single rotor device, the cavity could be located in a bearing mount wholly within, straddling or wholly without an end wall of the chamber. Depending on the geometry of the mount the cavity could be wholly within, straddling or wholly without the chamber. Thus, when it is said that the cavity is in communication with the zone containing fine, abrasive particulate material, this does not require that the cavity be located inside or outside the chamber. Rather, the term communication, in this context, simply indicates that there is a path through which the fine, abrasive material will be able to pass from the zone through the packing in the cavity in the absence of the fluid purge provided by the present invention.

Any suitable form of packing may be used. The packing may and in most instances will compress in the axial direction and expand in a radial direction to assist in forming seals against the shaft and surrounding surface of the cavity. Thus, the packing preferably is a somewhat resilient material, typically in the form of one or more circular rings of braided material, usually several rings. Rings or other forms of packing that have the preferred property of expanding in a radial direction when compressed axially may be made of any suitable material, including braided natural or synthetic yarn, roving or other forms of fiber. In certain high temperature applications, graphite-fiber filled packing may be particularly useful. Packing formed of solid synthetic resinous and/or elastomeric materials may also be used, for example in the form of "O"-rings.

The terms "ring" (as applied to packing) and "ring member" are used in this disclosure and in the appended claims in a very general sense. Rather than being limited to a circular shape, they refer to surrounding members of any shape compatible respectively with those of the cavity and shaft (for the packing) and of the shaft (for the ring member). Thus, while truly annular rings of circular cross-section are preferred, the rings of the present invention, including both the packing rings and the ring members, may be of circular, square, triangular or other cross-section at their peripheries and/or at the ring member inner surfaces.

When it is said that the ring member is rigid, this does not require absolute inflexibility. The ring member need only have sufficient rigidity to maintain a sufficiently constant clearance. Ring members with some resilience may be sufficiently rigid where the ring member is not placed under axial compression by the packing. Thus, rigid as used herein includes ring members made of semi-rigid materials fabricated into ring members in such a way that the ring members can maintain sufficient clearance in the context of the particular application and configuration of the apparatus.

The rigidity of the ring members, whether or not they are intended to sustain substantial axial force, such as when packing is tightened against them, may for example be as follows. They are preferably substantially non-contracting in the radial direction. In this connection, substantially means that any contraction occurring under the above conditions will be small enough so purge fluid flow will remain sufficient to exclude process materials and/or other materials involved in the process, from the packing, if not from the clearance, to a reasonable extent.

In some embodiments, the ring members will be subjected to axial force of sufficient magnitude to axially compress packing against the ring and thus effect a satisfactory seal between the packing, the shaft and the surrounding surface of the cavity. Sealing to the extent that permits a small amount of leakage from the packing, for example a few drops per minute in the case of a purge liquid, is generally considered to be a satisfactory seal, since the small amount of fluid that leaks will, in the appropriate packing arrangement, lubricate the packing-shaft interface. It thus appears possible to meet the criterion of substantially non-contracting with materials of construction for the ring member that are rigid or semi-rigid materials. A few examples of many synthetic polymers which are available, at least some of which exhibit suitable levels of abrasion resistance, modulus of compression and, if necessary, chemical resistance, are phenolic resins, crystalline polypropylene and acrylonitrile-butadiene-styrene copolymers.

Particularly preferred embodiments of the ring member, whether compressed by packing or not, have sufficient rigidity so that they undergo no operationally significant axial compression or radial size change (in radially inward and outward directions) during operation of the apparatus. While ring members of highly rigid polymers could serve this purpose, it is readily attained by metallic ring members, which are preferred. Examples of suitable metals for the ring member include cast iron, steel, bronze and bronze alloys, a bronze alloy containing about 11% aluminum being preferred.

Preferably, all packing and other shaft-surrounding members, especially those that will contract radially inwardly to the extent that they can choke off or nearly choke off flow when subjected to the compression forces required to form an acceptable seal in the packing, are positioned in an axially outward direction relative to the ring member. More preferably, there are no radially inwardly contracting members, e.g., elastomeric rings or the like, between the ring member and any axially inward wall of the cavity or other member against which the ring member bears.

In the summary of the invention, it was explained that the ring member has a surface which is located between a certain zone and the packing. In this context, the word between was used in a broad enough meaning to include the possibility that that surface may or may not be separated by some amount of axial distance or by some intervening structure from the zone, from the packing or from both of them. Thus, while it is preferred that the packing be separated from the bearing and contiguous with the ring, this is not essential.

The passage which conducts fluid to the clearance may include a number of component parts of differing design. In certain preferred embodiments, the passage components may include one or more openings through the body of the ring through, for example, radial grooves formed in an end face of the ring. Other components of the passage may include bores in portions of the structure of the apparatus surrounding the cavity or such other enclosure in which the ring is located. Other components of the passage may include tubing leading from the outside surfaces of the above-mentioned apparatus structure to any suitable flow control for, and source of, the fluid to be conveyed through the passage to the clearance.

The term fluid, as used herein, refers to materials of any kind or composition, whether or not they have measurable viscosity, and whether they are thixotropic or not, that are useful in purging the clearance between the ring member and adjacent portion of the shaft or, where it is desired to do so, in purging the packing. Non-limiting examples include steam, water, inert gases, air and grease.

Typically, the first centering member will be connected with the ring member. The term connected is used in a very general sense to include the possibility that the centering member may be formed in or on the ring member. However, the first centering member may be a part made separate from the ring member but attached or otherwise associated with it in a manner that maintains a predetermined spatial relationship, ordinarily a concentric relationship, between them.

The second centering member may be attached to any portion of the structure of the apparatus, other than the ring, which enjoys a relatively fixed position with respect to the shaft axis, disregarding changes in the position of the axis resulting from flexure of the shaft when in operation. The second centering member is connected with such structure, the term connected being used here in a general sense similar to that described above. Thus, the second centering member may be formed in or on a surface of the cavity or of another enclosure in which the ring is mounted. In the alternative, the second centering member may be a part made separately from the structure of the cavity or other enclosure for the ring but either attached to or associated with that structure in such a way as to maintain the desired and preferably concentric relationship between the second centering member and the shaft axis.

The centering members include centering surfaces. The word include, in this context, and in each of its grammatical forms, is intended to embrace the possibility that the centering members may or may not have components or features other than these surfaces.

In the most preferred embodiment, the first centering member is integral with the ring and the first centering surface of the first centering member is merely a surface of the ring itself. Likewise, in the most preferred embodiments of the invention, the second centering member is an integral portion of the enclosure that houses the ring, and when the ring is housed within the cavity, the second centering surface of the second centering member is preferably merely a surface of the cavity that is complementary to the first centering surface of the ring.

Figure 1:
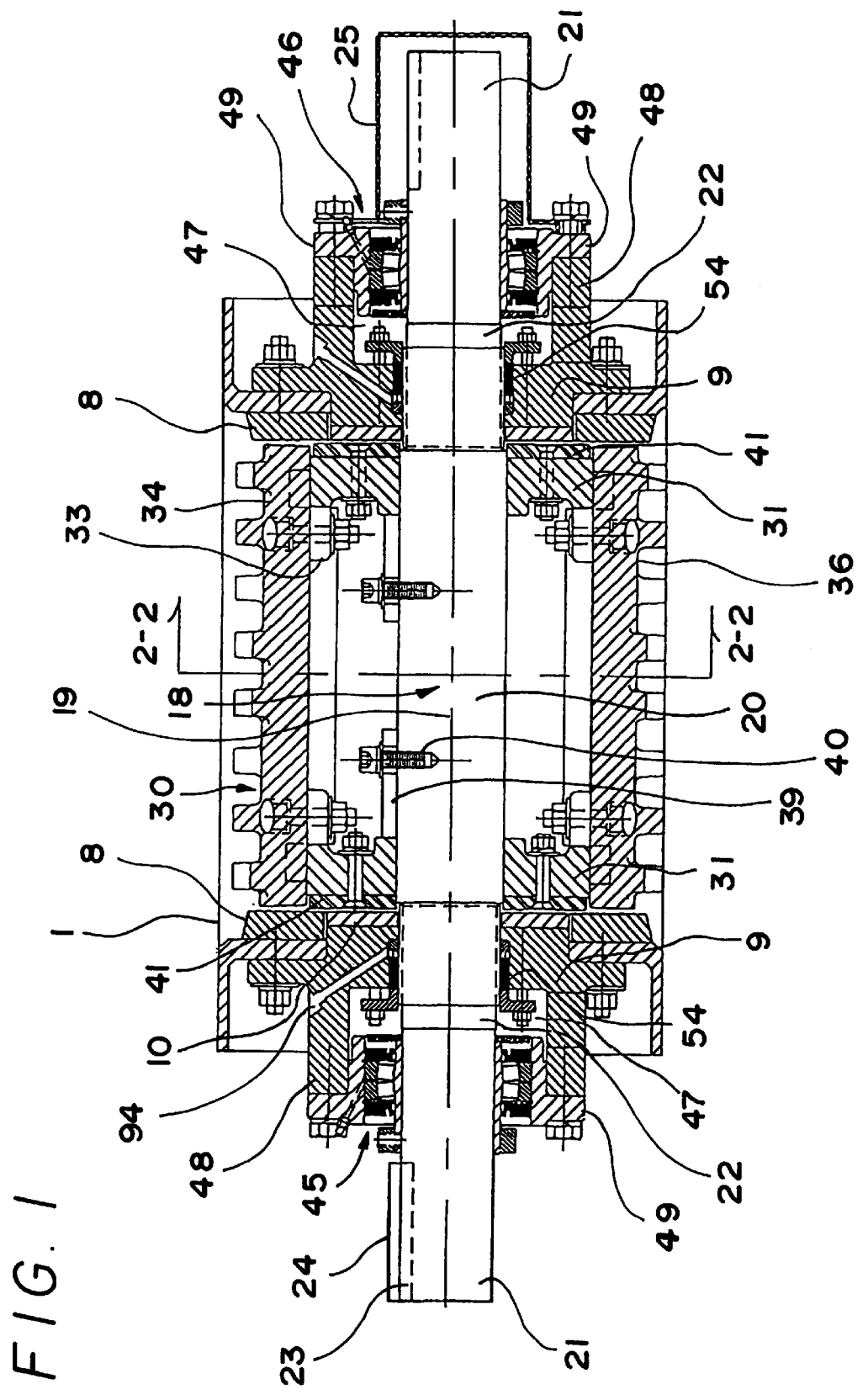

The first and second centering surfaces may have a wide variety of shapes, so long as their respective shapes are complementary. By this, it is meant that the shapes need not be absolutely congruent, but should contact one another at a sufficient number of points and/or over a sufficient area of interface so that they can perform their intended function. One specific example of first and second centering surfaces is a cylindrical sleeve and matching bore. See for example U.S. Pat. No. 1,056,282, FIG. 1, in which the ring member includes an axially-extending centering sleeve of circular cross-section that engages a complementary bore. The sleeve is identified by reference letter l.

In a particularly preferred embodiment of the present invention, the centering surfaces are at least partly inclined relative to a reference plane, that plane being perpendicular to the shaft axis. Using inclined centering surfaces, as compared to an axially-extending centering sleeve and complementary bore, can provide one or more advantages. When inclined centering surfaces are used, the dimensional relationship between the outside diameter of the ring and the surrounding wall of the cavity or other enclosure for the ring is less critical than the dimensional relationship between the outside diameter of the sleeve and the inside diameter of the bore. The tolerance between the ring O.D. and the surrounding wall I.D. can be made larger without impairing centering efficiency. When and if properly implemented, this feature of some aspects or embodiments of the invention can facilitate ring installation and removal and/or reduce the cost of fabrication of the apparatus.

When it is said that the surfaces are inclined, it is not intended to indicate that the surfaces, viewed in section, must be entirely inclined or represent straight lines. They may, for example, include or be defined in part by arcuate lines, straight lines, saw-toothed patterns, or other profiles, some portions of which may not be inclined relative to the plane.

However, surfaces representing straight lines, when viewed in section, are preferred. In certain circumstances, they can accommodate a small amount of transitory shaft deflection during operation of a grinder, if the periphery of the ring is surrounded by enough clearance to accommodate radial motion of the ring in response to such minor deflection. Where the seal and the ring are part of a floating seal assembly, and especially in embodiments in which the cavity or other enclosure for the ring moves radially in response to transitory deflections, arcuate, saw-tooth and other regular or irregular centering surface profiles may be more readily employed.

Examples of surfaces representing straight lines include those in which the first and second surfaces correspond to the outer faces of a truncated cone or truncated three or four sided pyramid. In this case, the other centering surface is a complementary and preferably congruent female socket. Because the inclination of the centering surfaces can be in the form of divergence in a radially outward direction from either side of the reference plane, the female socket of the foregoing embodiments may be present on either the first or second centering member and thus, in the most preferred embodiments, may be present on the ring or on a wall of the cavity.

The balanced distribution of fluid that can be achieved in the practice of at least some forms of the invention does not require absolutely uniform distribution of fluid at all locations around the clearance as viewed in a plane perpendicular to the shaft axis. Rather, the term balanced distribution is intended to include any variations in flow at these locations consistent with sufficient uniformity to prevent entry of material into the packing, or escape of material through the packing, in amounts unacceptable for the particular application in which the invention is being used. Thus, there may be some non-uniformity in the shape and cross-section of the clearance. It is however an advantage of the invention that, in its preferred embodiments, it can afford substantially uniform distribution of fluid flow at all locations around the clearance. This, in turn, can lead to long runs of the apparatus, without unacceptable amounts of material escaping through the packing or, where desired, entering the packing. Barring entry of harmful materials into the shaft-packing interface can also lead to long runs of apparatus uninterrupted by stoppages to repair the effects of the harmful materials.

In a particularly preferred embodiment, where the ring member is a fluid distribution ring, the rate of purge fluid flow is maintained at a sufficient level, given the pressure within the processing chamber, the particle size of fine abrasive particles in zone 14 and any other controlling conditions, to substantially bar entry of such particles into the clearance, thus protecting the distribution ring from damage by such particles.

The invention, as described above, may be embodied in a wide variety of forms falling within the scopes of the appended claims and their equivalents. Thus, without any intention of limiting the scope of the invention, the applicant now presents what is deemed to be the best mode of practicing the invention.

The most important need for the invention presently known to the inventors is in clinker grinders for bottom ash in coal-fired generating plants. There, the grinders may be required to function in a high temperature environment. Perhaps an even greater challenge is that fact that some of these plants quench the ash with water that can accumulate in grinder inlet chutes to create a significant hydraulic head against which purge fluid systems must operate. Insufficient purge fluid pressure, or insufficient purge fluid pressure in a portion of the ring member-shaft clearance resulting from poor centering, generally results in a strong tendency for fine abrasive particles of ground bottom ash to wend their way from the grinder chamber along the shaft towards the seals provided to protect the main shaft bearings. It has proven difficult in practice to prevent these particles from entering the interface between the packing and the shaft, and there damaging the packing and/or the shaft.

The drawings show a clinker grinder of the type which has heretofore been supplied by the assignee of the present application, except that that grinder has been modified in accordance with the invention. The so-improved grinder will now be described with reference to FIGS. 1–9.

Figure 3:
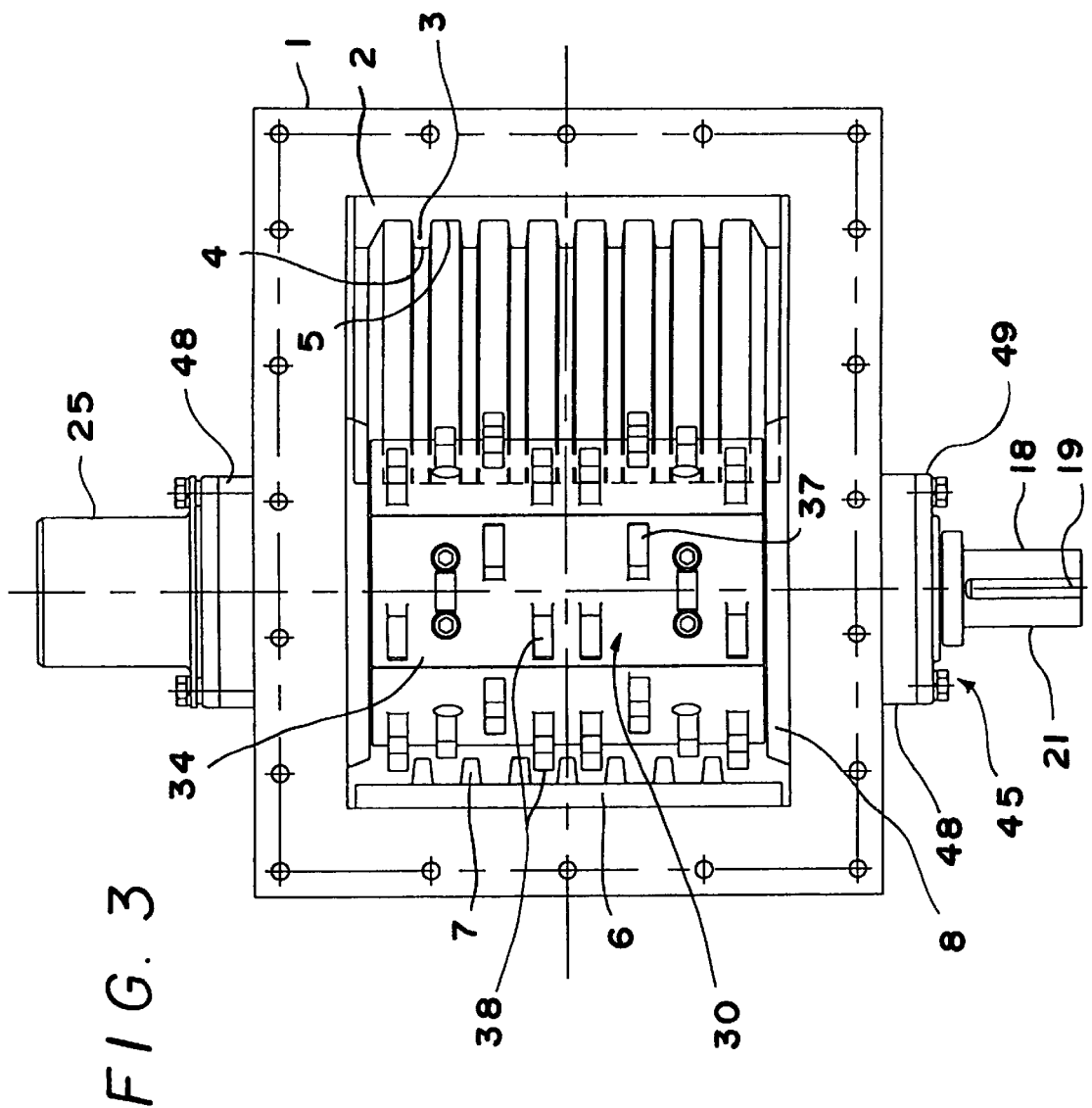
FIG. 3 is a top view of the grinder of FIGS. 1 and 2.

The transverse and longitudinal section of FIGS. 1 and 2 and the top view of FIG. 3 provide an overall illustration of the grinder as a whole. Persons skilled in the art are familiar with the nature and proper arrangement of the upstream and downstream equipment typically associated with such grinders, and they have not therefore been illustrated in the drawings or described in the present text.

Figure 4:
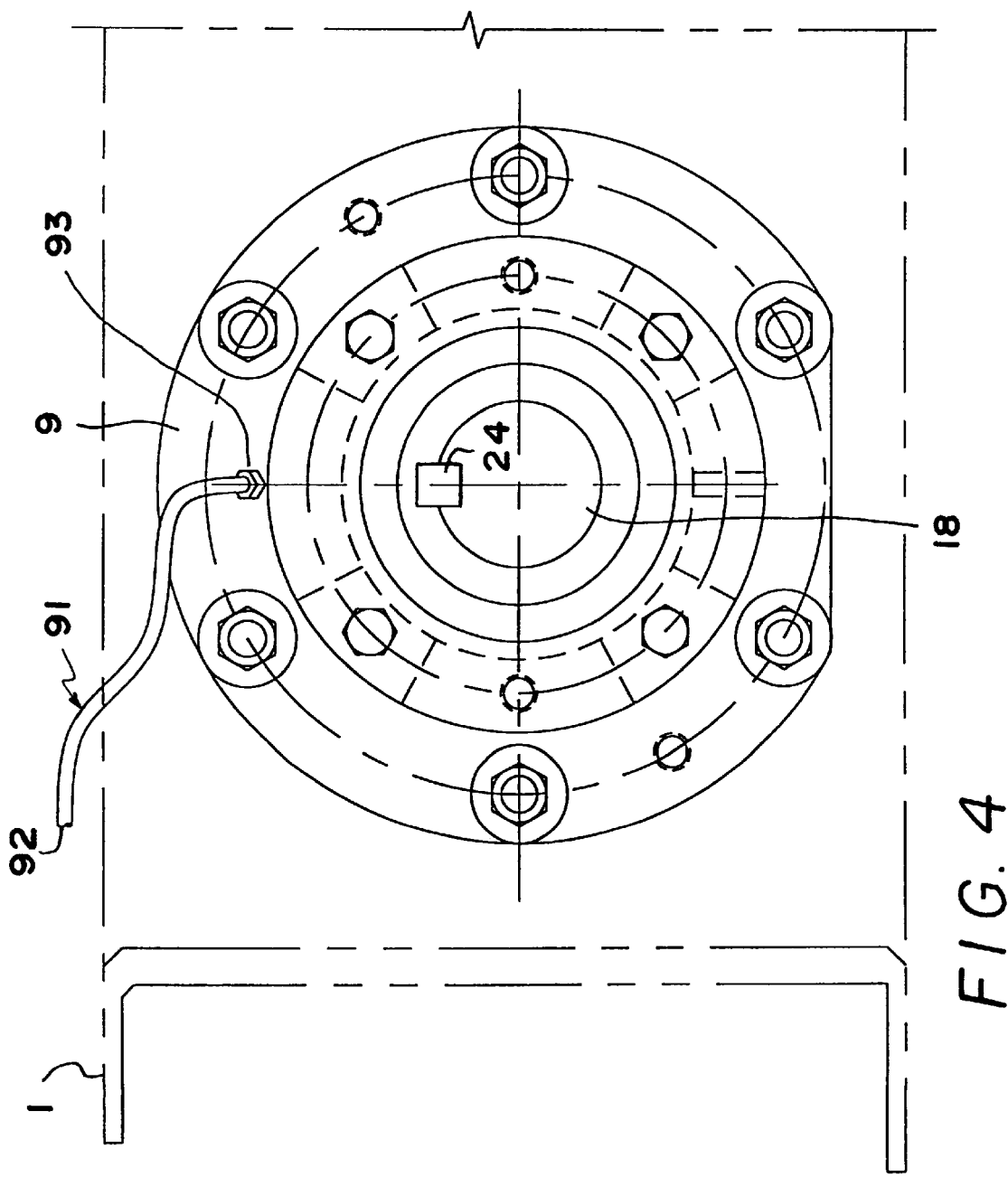
FIG. 4 depicts the left end of the grinder of FIG. 1.
Figure 5:
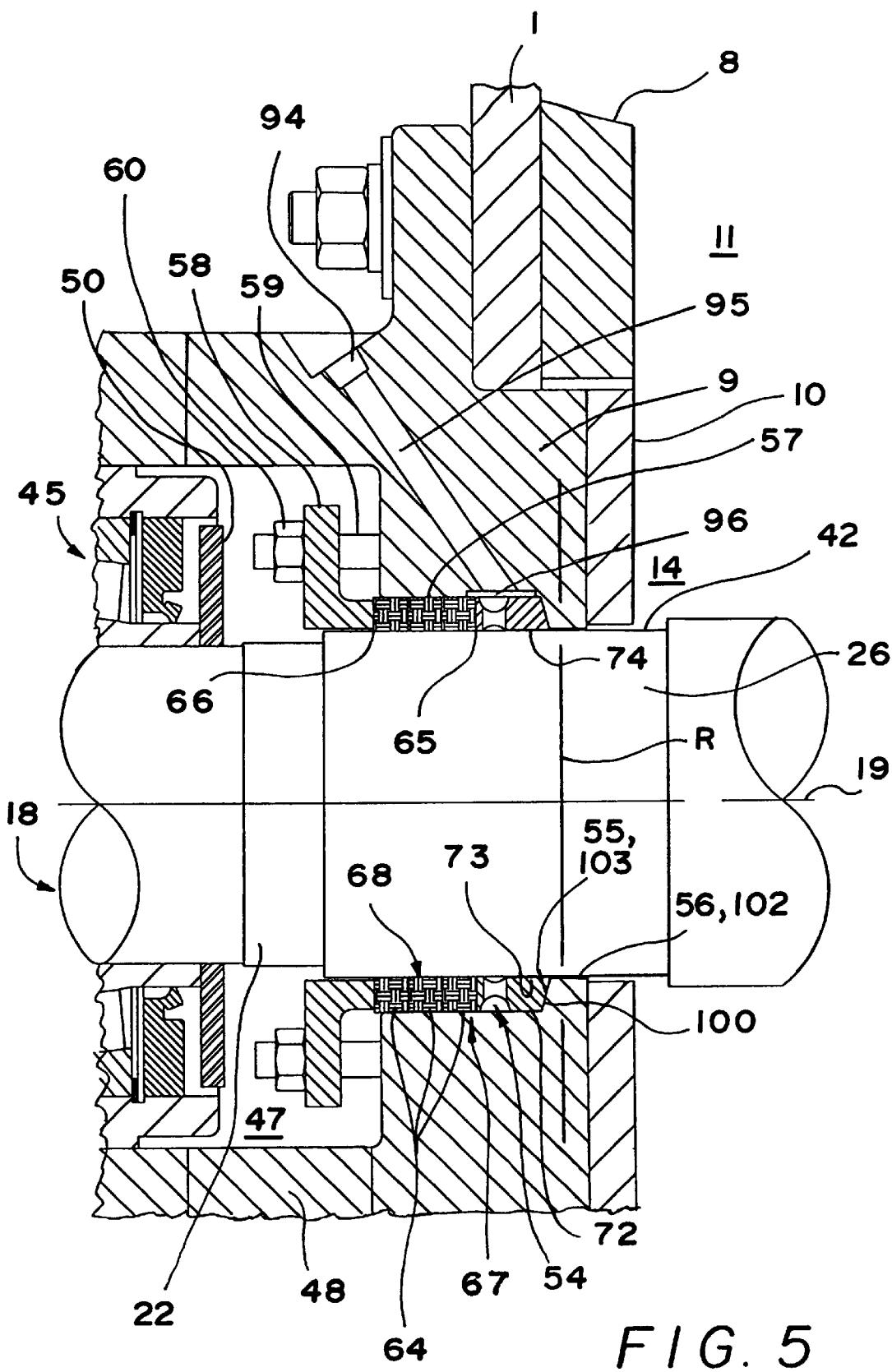
FIG. 5 is an enlarged portion of the left side of FIG. 1, including a cavity, a ring member in the form of a fluid distribution ring, packing and a compression ring, as well as portions of a chamber, a shaft and a bearing, that are shown in FIG. 1.

As shown in FIGS. 1–9, the embodiment of the invention deemed to be the best mode includes the usual frame 1. In the frame, as shown by FIGS. 2 and 3, is mounted a breaker plate 2 having the usual ridges 3 with crests 4 and valleys 5. On the opposite side of the frame is a deflector plate 6 with comb members 7. FIG. 1 shows the frame side liner 8, which protects the frame from damage and wear. Bearing and seal housing blocks 9 are secured to each side of the frame, and are protected from wear by bearing-seal block wear liners 10. The foregoing elements provide the surrounding structure for a material processing chamber 11, best seen in FIG. 2. In this case, the material processing chamber is a clinker grinder chamber, having inlet 12 and outlet 13. In at least a portion of this chamber, zone 14, which is best seen in FIG. 5, there is a zone 14 in which abrasive fine particles of ash are present.

It may be seen in FIGS. 1–5 that the grinder includes shaft 18 having axis 19. Shaft mid-portion 20 has flat surfaces due to its square cross-section. End portions 21 and intermediate portions 22 have circular cross-sections. Keyway 23 and key 24 are present on the left, active shaft end portion 21 for securing a drive sheave (not shown) or sprocket (not shown) to the shaft. Other parts commonly used to power grinders, and which are thus familiar to persons skilled in the art, are not shown in the drawings, and include such items as drive belts or chains, motors, motor mounts, reducing gears and controls. As FIG. 1 shows, the non-active right end is protected by shaft cap 25. Shaft 18 may include, and in this embodiment as seen in FIGS. 1 and 5, does include a wear sleeve 26 which, in this case, has been fitted to one of the shaft intermediate portions 22.

As indicated above, the material contacting member of this embodiment is rotor 30. It carries roll hubs 31 that have central square openings 32 that fit on the square mid-portion 20. Roll face segments 34, which are of fixed length and are fixedly secured to flanges 33 on the hubs with the aid of fasteners 35, maintain a fixed spacing between the hubs. Keeper bars 39 and fasteners 40 fix the axial position of the rotor. Hub wear liners 41 protect the hubs from wear. On the outer faces 36 of roll segments are teeth 37, arranged in angularly-staggered circular arrays 38. Rotor 30, comprising the roll hubs 31, roll face segments 34 and teeth 37, cooperates with breaker plate 2 the grind particulate solid ash material at least in part to abrasive fine ash particles. At least a portion of these fine abrasives are present in zone 14, from which they would, if permitted, exit chamber 11 via a small gap 42 between shaft 18 and the radially inner-most edge of bearing-seal block wear liner 10.

The bearings of the present invention include spherical roller bearings 45 and 46. Bearing 45, on the left in FIG. 1, is a "held" unit, meaning that it is fixed against axial movement, while bearing 46, on the right, is a "free" unit that can move axially to accommodate thermal axial expansion and contraction of the shaft. Both bearings are provided with seals and jacking bolts. Both are equipped with flanges 49 by means of which they are secured at the mouths of cylindrical extensions 48 of bearing and seal housing blocks 9 and in recesses 47 formed within such extensions. Bearing flingers 50 are provided at the ends of the bearings nearest the rotor to fling outward, by centrifugal force, any foreign materials that might attempt to gain entry to the bearing races and rollers.

Cavity 54 comprises an inner wall 55 which is part of a radially-inward projecting rim 56 of bearing and seal housing block 9. FIG. 5 shows how inner wall 55 may be inclined relative to reference plane R in directions that are radially outward and axially outward (i.e. toward bearings). The cavity also includes a surrounding surface 57. In the present embodiment, this surface is a surface of a surrounding upright wall in a central portion of bearing and seal housing block 9. At the axially outward end of the cavity is a compression ring 58 with draw nuts 60 on studs 59 which partially closes that end of the cavity and can compress in an axially inward direction the packing to be discussed below. Other devices, for example wave rings and the like, may in the alternative be used to compress the packing.

Although a wide variety of packing materials may be used, packing 64 of the present embodiment includes 3 annular packing rings, most clearly visible in FIG. 5, that would be circular if seen in end view, i.e., perpendicular to their central axes. These rings are typically prepared by forming running lengths of braided packing of square cross-section into circles by cross-cutting them at an angle into segments of exact length such that when their ends are brought into abutment to form circles, their outer diameters exactly match the diameter of the cavity. The abutments of the ends of the three rings are angularly staggered with respect to one another at 120 degree intervals. Collectively, the three rings represent a packing having inner end 65, outer end 66, a peripheral surface 67 bearing against cavity surrounding surface 57 and a shaft-contacting surface 68, bearing against shaft wear sleeve 26 on the surface of intermediate shaft portion 22.

Ring member 72 may be enclosed in cavity 54, as FIG. 5 shows, but it can be in a separate enclosure. The ring member has a surface 73 which, in this embodiment, faces radially inward. That is, surface 73 faces toward shaft axis 19 in confronting but spaced relationship with at least one portion of the shaft surface. In this embodiment, there is confrontation with a portion of wear sleeve 26. Between them, the confronting surfaces of the ring member and shaft define a clearance 74. A fluid supply passage, to be described below, may connect with clearance 74 via a path that does not pass through the ring member. Preferably the passage does connect with clearance 74 through passageways in (including on) the ring member, for example through one or more grooves passing along one or more faces of the ring member, or through bores or other kinds of openings passing through at least a portion of the body of the ring member, and, in this case, the ring member is referred to as a fluid distribution ring.

Accordingly, the fluid distribution ring portion 78 of the ring member is an optional but preferred feature of the embodiment illustrated in FIGS. 1–9 and is best seen in FIGS. 5–10. The preferred ring member of the present embodiment has a planar left side 79. It is a surface in a plane perpendicular to shaft axis 19. There is a ring outer belt channel 80, a peripheral channel, which is adjacent left side 79. Ring inner belt channel 81 is also adjacent left side 79 and is in coplanar relationship with outer belt channel 80. Six angularly distributed radially oriented fluid-transmitting openings 82 are distributed at 60 degree angular intervals around the ring member. Pulling bores 83, angularly distributed axially extending threaded openings in left side, are provided to receive bolts than may be grasped by a tool to help remove the ring member from the cavity.

Whether the ring member is a fluid distribution ring or not, embodiments of the invention may include an optional nose section 87. It represents an axial extension of the ring member in an axially inward direction, that is, in an axial direction away from the bearings; when a nose section is present, it can act as a packing spacer and/or can represent a centering member, to be described in greater detail below.

The above-mentioned purge fluid supply passage includes, in this embodiment, tubing 91, seen in FIG. 4, having a first end 92. It is shown as broken off but connects to a source and means (not shown) for supplying and controlling flow of purge fluid. Its other end 93 has a threaded male fitting on it. This fitting is threaded into an inlet 94 with female threads (not shown) through which the passage enters the body of bearing and seal housing block 9 (FIG. 5) and passes through the body of bearing and seal housing block 9 in bore 95 to an outlet 96 in cavity 54. Outlet 96 is a bore of short length but larger diameter than bore 95, located at the entry point of bore 95 into the cavity.

As indicated above, at least one first centering member is connected with the ring member. The first centering member includes at least one first centering surface. It is at least partly inclined to either side of reference plane R which is perpendicular to the axis of the shaft. Whether a nose section is present or not on the ring member, the first centering member may be at least a portion of any axially inward-facing surface of the ring member. When the ring member is or includes a fluid distribution ring, the first centering member may be at least a portion of an axially inward-facing surface thereof.

In the present embodiment, which includes a nose section, the latter represents a first centering member which may be connected to the ring member by being integrally formed therewith. This first centering member has an inclined frusto-conical face 100. In this embodiment, the face 100 represents the first centering surface and is on an axially inward end of the ring member 72. Face 100 is inclined relative to reference plane R in directions that are radially and axially outward (i.e. toward bearings). But this face can optionally be inclined in radially outward and axially inward directions if desired.

In accordance with the invention, there is also at least one second centering member that is connected with a wall of the ring member enclosure. It includes at least one second centering surface that is at least partly inclined to either side of reference plane R and is complementary to the first centering surface. When the ring member is in an enclosure other than the cavity 54, the second centering member may be at least a portion of any axially outward-facing face of, and may thus be integral with, that enclosure. optionally, the second centering member may be at least a portion of any axially outward-facing face of an insert in that enclosure, and may thus be a part formed separately from, the walls of that enclosure. However, in the present embodiment, the ring member is enclosed in cavity 54, and the second centering member is an inclined frusto-conical face 103.

In this embodiment, the face 103 represents the second centering surface and is on an axially inward end of the cavity 54. Face 103 is inclined relative to reference plane R in directions that are radially and axially outward (i.e. toward bearings). But this face can optionally be inclined in radially outward and axially inward directions if desired.

FIG. 10 illustrates an embodiment of the invention which is wholly identical to that of FIGS. 1–9, except that it includes a ring member 106 which has non-integral fluid distribution and nose sections. Fluid distribution ring section 107 has an axially inward end 108 with, for example, a circular groove 109. Nose section 110 has an axially outward end 111 with, for example, a circular "tongue" 112. Here the first centering member, nose section 110, is a member formed separately from the ring member, fluid distribution ring section 107, and is connected with the ring member by an arrangement, in this case the tongue and groove, that maintains both sections concentric with shaft axis 19. For this embodiment, the first centering surface is an inclined frusto-conical face 113 similar to inclined frusto-conical face 100 of FIG. 8. As in the embodiment of FIGS. 1–9, the face 113 can be inclined radially outward and either axially inward or outward. Ring member 106 has a ring outer belt channel, a ring inner belt channel and 6 angularly distributed radial fluid-transmitting openings as in the prior embodiment.

In the clinker or bottom ash grinder application of the invention, ash accumulates on boiler walls and tubes and is removed in timed cycles or flows to the bottom of the boiler in a molten state. This material, known as bottom ash or clinker, is cooled at the bottom of the boiler by water quenching and collected in slag tanks. Consequently, clinker grinders most often operate under a head of slurry (water-ash mixture) which can be as great as 25 feet or approximately 10 psi or higher depending on the apparent density of the slurry.

The clinker grinder typically crushes the bottom ash as it leaves the slag tank to a top size of 1½"×0 to 1¼"×0, so it can be pumped through a slurry line to an ash disposal area. In this crushing process, fines are usually generated. The resulting water/fines slurry is a highly abrasive medium. Therefore, clinker grinders typically have water purge systems that will "flush" any of this abrasive slurry away from the packing area.

In the preferred embodiment of the invention shown in FIGS. 1–9, the packing is compressed axially and expands radially outward and inward to form a satisfactory seal between the rotating shaft, the packing and the surrounding wall of the housing. Continued water tightness over an extended period of grinder operation is maintained by tightening the bolts of the compression ring.

Flow rate and flow velocity of the purge fluid, which are influenced by purge fluid pressure and the radial dimension of the seal/shaft clearance, are believed to contribute in an important way to the success of this embodiment. Although the optimum values for these criteria have not yet been established, acceptable criteria for the water purge include an inlet water pressure which is about 10–15 psi higher than the pressure in the grinder chamber, a water linear velocity of approximately 10 feet per second, more or less, it appearing that lower velocities can be used, and a water flow rate of 3 to 5 gpm through each seal.

Tests of fluid distribution rings of the general type disclosed in the figures indicated that purge water linear velocities on the order of about 5 to about 12 feet per second can be attained at pressure differentials of about 27–35 psi and flow rates of about 3 to 3¾ gpm, working with shaft-seal clearances of 0.0095 inch (nominally 0.01 inch) to 0.0175 inch (nominally 0.018 inch). However, units of several sizes (e.g. 36×30, 33×30, 27×20) constructed in accordance with the invention based on shaft/ring member clearance tolerances of about 0.016 to 0.021 and about 0.032–0.037 inch, appear to operate successfully.

According to yet another aspect of the invention which can be embodied in the apparatus of FIGS. 1–9, fluid distribution rings of the type illustrated in these figures can be provided with two different clearances. These assist in directing purge fluid toward the chamber and away from packing that is located "behind", or on the axially outward side of, the ring. Turning to FIGS. 6, 8 and 10, the fluid distribution rings shown there have a narrow surface 84, which we call an outboard flange, located to the left of ring inner belt channel 81. A wider surface 85, called the inboard flange, is to the right of ring inner belt channel 81. According to this embodiment of the invention, the clearance between the shaft and the ring at the outboard flange can be just sufficient to provide shaft/ring tolerance clearance and to allow sliding of the ring onto the shaft without binding. The inboard flange diameter can be adjusted to provide the desired flow rates and velocities of purge fluid moving toward the chamber and away from the packing. For example, where the clearance $C_1$ between the shaft and the outboard flange is in the range of about 0.006 to about 0.009 inch, the clearance $C_2$ between the shaft and the inboard flange may be in the ranges of about 0.016 to 0.021 and about 0.032–0.037 inch, as described above.

Persons skilled in the art will readily understand that the invention may be used in many differing applications and embodiments. Thus, the accompanying drawings and the foregoing embodiments are offered for purposes of illustration not limitation. Consequently, the scope of the invention is intended to include all embodiments falling within the scope of the appended claims and their equivalents.

What is claimed is:

1. Apparatus having a fluid purge system operating in conjunction with a shaft, packing and/or other portions of the apparatus, said apparatus comprising:

a material processing chamber including a zone in which material is present which should be substantially barred, during operation of the apparatus, from escaping through the packing, a moveable shaft having
      a longitudinal axis and
      one or more surfaces, a material-contacting member connected with the shaft and present at least partly within the chamber during at least a portion of the motion of the shaft and said member, at least one bearing in which the shaft moves, a cavity surrounding a portion of the shaft in communication with said zone, packing located in the cavity between said zone and the bearing and held in sealing engagement with at least one surface of the shaft, a substantially rigid ring member
      located in an enclosure surrounding said shaft and
      having at least one ring member surface located between said zone and the packing and positioned in confronting but spaced relationship with at least one portion of the shaft surface to define at least one small clearance between the confronting surfaces of the ring member and shaft, at least one fluid supply passage extending from outside the ring enclosure to said clearance, at least one first centering member connected with said ring member, including at least one first centering surface at least partly inclined to either side of a reference plane perpendicular to the axis of the shaft and at least one second centering member connected with a wall of the ring member enclosure, including at least one second centering surface at least partly inclined to either side of said reference plane and complementary to said first centering surface, the positions of said first and second centering surfaces each being established with respect to the shaft axis so that, when the first and second centering surfaces are brought into contact with one another, the ring member surface is in a predetermined radial position with respect to the portion of the shaft confronted thereby.

2. Size-reduction apparatus in which solid feed particles are fed into a rotating, shaft-mounted rotor and in which abrasive fine particulate material is present, said apparatus comprising:

a size-reduction chamber including a zone, representing at least a portion of the chamber, in which the fine abrasive particulate material is present during operation of the apparatus, a rotatable shaft having
      a longitudinal axis and
      one or more surfaces, a size-reduction rotor connected with the shaft and present at least partly within the chamber during rotation of the shaft and rotor, at least one bearing in which the shaft rotates, a cavity surrounding a portion of the shaft in communication with said zone, packing located in the cavity between said zone and the bearing and held in sealing engagement with at least one surface of the shaft, a substantially rigid ring member
      located in an enclosure surrounding said shaft and
      having at least one ring member surface located between said zone and the packing and positioned in confronting but spaced relationship with at least one portion of the shaft surface to define at least one small clearance between the confronting surfaces of the ring member and shaft, at least one liquid supply passage extending from outside the ring enclosure to said clearance, at least one first centering member connected with said ring member, including at least one first centering surface, at least one second centering member connected with a wall of said cavity, including at least one second centering surface, the positions of said first and second centering surfaces each being established with respect to the shaft axis so that, when the first and second centering surfaces are brought into contact with one another, the ring member surface is in a predetermined radial position with respect to the portion of the shaft confronted thereby.

3. Size-reduction apparatus in which particulate solid ash material is converted at least in part to abrasive fine ash particles by contact with a rotating, shaft-mounted rotor, said apparatus comprising:

a size-reduction chamber including peripheral wall means, end wall means and an interior zone, representing at least a portion of the chamber, in which the abrasive, fine ash particles are present during operation of the apparatus, a rotatable shaft having a longitudinal axis, a size-reduction rotor connected with the shaft and present at least partly within the chamber during rotation of the shaft and rotor, at least one bearing mount that supports the shaft and that includes at least one bearing in which the shaft rotates and a seal cavity surrounding a portion of the shaft in communication with said zone, packing located in the cavity between said zone and the bearing and held in sealing engagement with at least one surface of the shaft, a substantially rigid ring member
  located at least partly in the cavity,
  positioned in axial engagement with that portion of the packing which is nearest said zone and
  having at least one ring member surface located between said zone and the packing and positioned in confronting but radially spaced relationship with at least one portion of the shaft surface to define at least one small, substantially annular clearance between the confronting surfaces of the ring member and shaft, at least one fluid supply passage extends into the cavity, through the ring and into said clearance, at least one first centering member connected with said ring member, including at least one first centering surface, at least one second centering member connected with a wall of said cavity, including at least one second centering surface, the positions of said first and second centering surfaces each being established with respect to the shaft axis so that, when the first and second centering surfaces are brought into contact with one another, the confronting ring member surface and the portion of the shaft confronted thereby are established and maintained in a concentric relationship.

4. A method of processing material in apparatus having a fluid purge system operating in conjunction with a shaft, packing and/or other portions of the apparatus, said method comprising:

introducing process material into a material processing chamber including a zone in which the process material is present, and/or in which a potentially damaging material is present, during operation of said apparatus, causing a moveable shaft having a longitudinal axis and one or more surfaces to move in said chamber, causing a material-contacting member connected with the shaft to move on a path which is at least partly within the chamber during at least a portion of the motion of the shaft and said member, causing the shaft to move in at least one bearing, providing a cavity surrounding a portion of the shaft in communication with said zone, providing packing in the cavity between said zone and the bearing and held in sealing engagement with at least one surface of the shaft, providing a substantially rigid ring member in an enclosure surrounding said shaft and having at least one ring member surface located between said zone and the packing and positioned in confronting but spaced relationship with at least one portion of the shaft surface to define at least one small clearance between the confronting surfaces of the ring member and shaft, providing at least one first centering member connected with said ring member, including at least one first centering surface at least partly inclined to either side of a reference plane perpendicular to the axis of the shaft, providing at least one second centering member connected with a wall of the ring member enclosure, including at least one second centering surface at least partly inclined to either side of said reference plane and complementary to said first centering surface, by maintaining said first and second centering surfaces in contact with one another, maintaining the ring member surface in a predetermined radial position with respect to the portion of the shaft confronted thereby, through at least one fluid supply passage extending from outside the ring enclosure, supplying purge fluid to said clearance, and with the aid of the first and second centering members, maintaining a balanced distribution of fluid throughout the at least one small clearance between the confronting surfaces of the ring member and shaft.

5. A method according to claim 4 including generating abrasive fine particulate material in said chamber and making said material available in said zone at least in part by contacting particulate solid feed material with a material-contacting member in the form of a rotating, shaft-mounted rotor.

6. A method according to claim 5 wherein the particulate solid feed material is in the form of a slurry containing particulate solids.

7. A method according to claim 5 wherein the particulate solid feed material is in the form of bulk solids.

8. A method according to claim 4 wherein the purge fluid is a liquid.

9. A method according to claim 4 wherein the purge fluid is water.

10. A method according to claim 4 wherein the ring member is a fluid distribution ring, the zone includes fine abrasive particles, and the rate of purge fluid flow is maintained at a sufficient level to substantially bar entry of such particles into the clearance, thereby protecting the distribution ring from damage by such particles.

* * * * *